United States Patent [19]
Gill et al.

[11] Patent Number: 5,081,446
[45] Date of Patent: Jan. 14, 1992

[54] SECURITY TAG FOR COMPACT DISC STORAGE CONTAINER

[75] Inventors: Peter L. Gill, Long Valley; Anthony F. Piccoli, Audubon, both of N.J.

[73] Assignee: Checkpoint Systems, Inc., Thorofare, N.J.

[21] Appl. No.: 586,934

[22] Filed: Sep. 24, 1990

[51] Int. Cl.⁵ ............................................. G08B 13/14
[52] U.S. Cl. .................................... 340/572; 340/568
[58] Field of Search ................................ 340/572, 568

[56] References Cited

U.S. PATENT DOCUMENTS

| | | | |
|---|---|---|---|
| 4,021,705 | 5/1977 | Lichtblau | 340/572 |
| 4,567,473 | 1/1986 | Lichtblau | 340/572 |
| 4,774,521 | 9/1988 | Okada | 340/572 |
| 4,914,421 | 4/1990 | d'Alayer de Costemore d'Arc | 340/568 |

Primary Examiner—Jin F. Ng
Assistant Examiner—C. Oda
Attorney, Agent, or Firm—Panitch Schwarze Jacobs & Nadel

[57] ABSTRACT

A security tag for a compact disc container holding a compact disc is comprised of a generally flat substrate which includes circuitry for establishing a resonant circuit. The substrate is positioned within the compact disc storage container such that a first portion of the substrate extends beyond the periphery of the compact disc and a second portion of the substrate overlaps at least a portion of the compact disc. A part of the circuitry is located on each of the first and second portions of the substrate so that the frequency of the resonant circuit is established at least in part by interaction between the circuitry and the compact disc. The security tag is used in an electronic security system for a surveilled area, including a transmitter for transmitting electromagnetic energy into the surveilled area at a predetermined detection frequency and a receiver for detecting the presence of a security tag resonating at a detection frequency within the surveilled area.

6 Claims, 3 Drawing Sheets

SECURITY TAG FOR COMPACT DISC STORAGE CONTAINER

BACKGROUND OF THE INVENTION

The present invention relates generally to security tags used with electronic security systems for detecting the unauthorized removal of articles and, more particularly, to such security tags which are particularly adapted for use with a compact disc container.

The use of electronic article security systems for detecting and preventing theft or other unauthorized removal of articles or goods from retail establishments and/or other facilities, such as libraries, has become widespread. In general, such security systems employ a security tag which is associated with or is secured to an article (or its packaging) which is readily accessible to potential customers or facility users and, therefore, may be easily removed. Security tags may take on many different sizes, shapes and forms, depending upon the particular type of security system in use, the type and size of the article, its packaging, etc. In general, such electronic security systems are employed for detecting the presence (or the absence) of a security tag and, thus, a protected article, as the protected article passes through or near a surveilled security area. In most cases, the surveilled area is located at or around an exit or entrance to the retail establishment or other facility.

One such electronic article security system which has gained widespread popularity utilizes a security tag which includes a self-contained, operatively tuned or resonant circuit in the form of a small, generally planar printed circuit which resonates at a predetermined detection frequency within a predetermined detection frequency range. A transmitter, which is also tuned to the detection frequency, is employed for transmitting electromagnetic energy into the surveilled area. A receiver, also tuned to the detection frequency, is positioned generally proximate to the surveilled area. Typically, the transmitter is located on one side of an exit and the receiver is located on the other side of the exit so that a person must pass between the transmitter and the receiver in order to exit the facility. In this manner, when an article having an attached security tag moves into or otherwise passes through the surveilled area, the tag is exposed to the transmitted energy. Upon receiving the transmitted energy, the resonant circuit of the tag resonates, providing an output signal detectable by the receiver. When the receiver detects such an output signal, indicative of the presence of an article with a security tag within the surveilled area, the receiver activates an alarm to alert appropriate security or other personnel.

Electronic article security systems of the type discussed above have been shown to be very effective in preventing the theft or unauthorized removal of articles, particularly articles which are relatively high in value and relatively small in size, such as jewelry, expensive clothing, video cassettes, etc. Small sized, relatively expensive items which are not protected by such systems are relatively easy prey because it is a relatively simple matter for a thief to insert articles of this type into a pocket, pocketbook or under an article of clothing and there is little likelihood that the theft of such articles could be detected by visual inspection.

One such small, but relatively expensive, article which has become increasingly vulnerable to theft due to its rise in popularity is the compact disc. Compact discs are typically stocked and sold in a generally flat, rectangularly shaped plastic container having a width which generally corresponds to the diameter of the compact disc (approximately $4\frac{3}{4}$ inches) and a length which is slightly greater than the diameter of the compact disc (about $5\frac{1}{2}$ inches). The container includes an insert having an annular groove approximately the same size as the compact disc for receiving and holding the compact disc. The relatively hard plastic container, in combination with the insert, provides protection for the compact disc during shipment and storage, affords an attractive display for the compact disc and provides further protection and convenient storage for the compact disc after it has been sold. Thus, because of the size and shape of the compact disc container, it is a relatively easy task for a thief to remove one or more compacts discs, each within its own container, with little concern that the theft of the compact disc will be visually detected.

The present invention relates to a security tag which is particularly adapted for use with a compact disc container holding a compact disc. A security tag made in accordance with the present invention is sized and shaped to fit within the compact disc container at a relatively unnoticeable position between the container insert and the bottom of the compact disc container. The security tag of the present invention makes use of the properties of the compact disc in defining the resonant frequency of the tag. The security tag of the present invention is also specifically designed to prevent the metal within the compact disc from blocking or otherwise interfering with the ability of the tag to resonate when located within a surveilled security area of an electronic article security system of the type described above.

SUMMARY OF THE INVENTION

Briefly stated, the present invention comprises a security tag for a compact disc container holding a compact disc. The security tag is used with an electronic security system for a surveilled area, including transmitter means for transmitting into the surveilled area electromagnetic energy within a predetermined detection frequency range, and receiver means for detecting within the surveilled area the presence of a security tag resonating at a frequency within the detection frequency range in response to the electromagnetic energy. The security tag is comprised of a generally flat substrate positioned within the compact disc storage container such that a first portion of the substrate extends beyond the periphery of the compact disc and a second portion of the substrate overlaps at least a portion of the compact disc. Circuitry means on the substrate are provided for establishing a resonant circuit. At least part of the circuitry means is located on each of the first and second portions of the substrate. In this manner, the resonant frequency of resonant circuit is established at least in part by interaction between the circuitry means and the compact disc.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred, it

Figure 1:
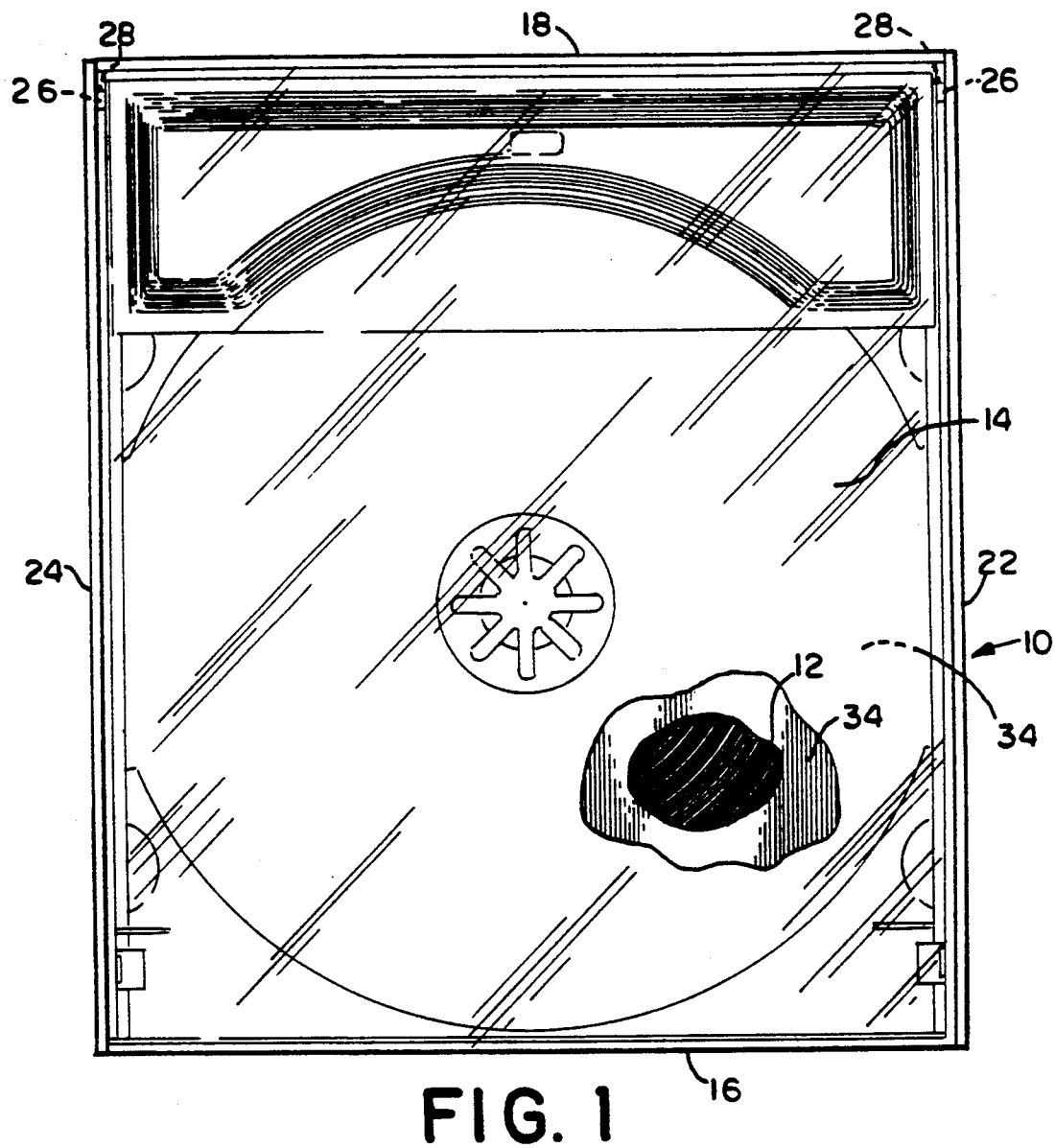

3 being understood, however, that the invention is not limited to the precise arrangements and instrumentalities disclosed.

Figure 3:
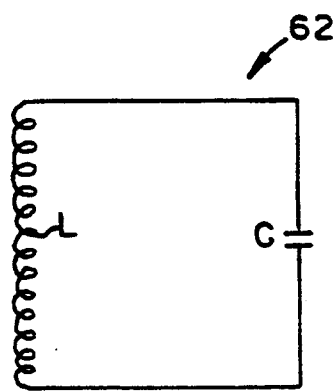
Figure 2:
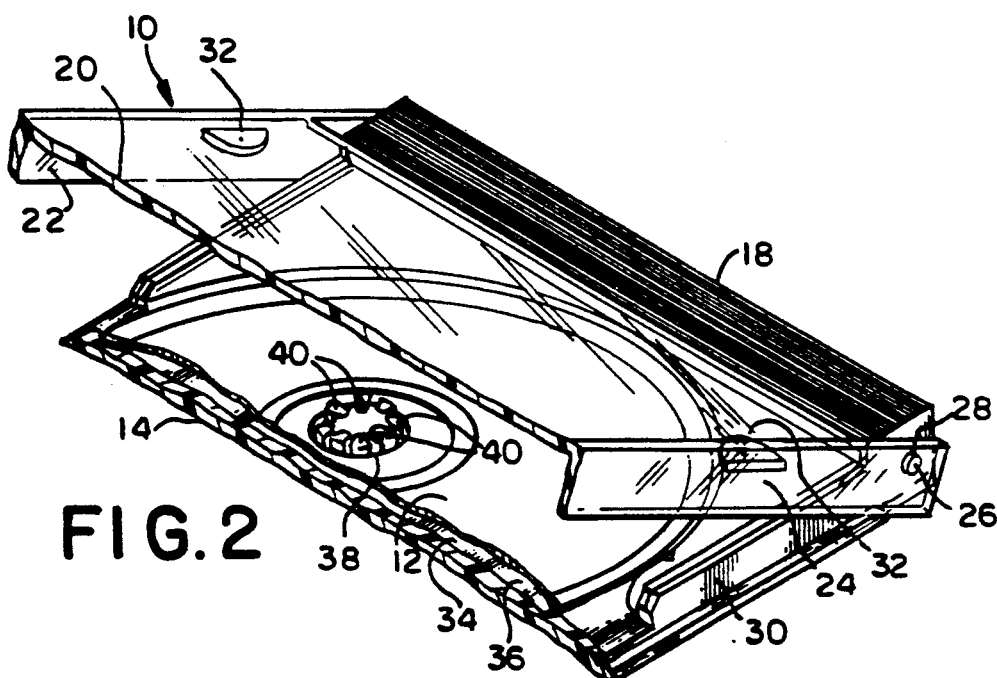
Figure 4:
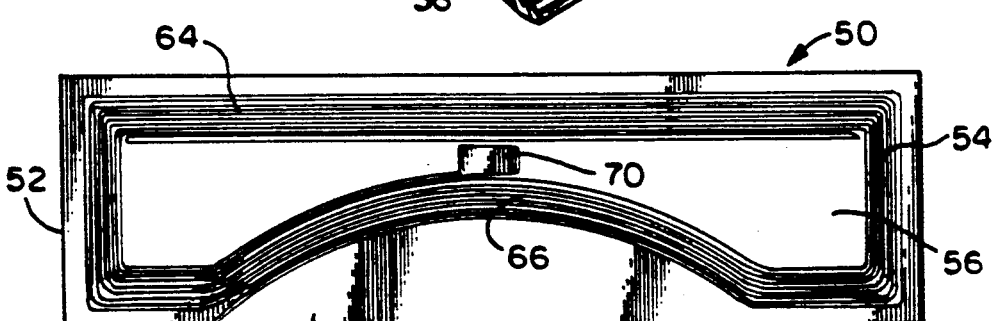
Figure 5:
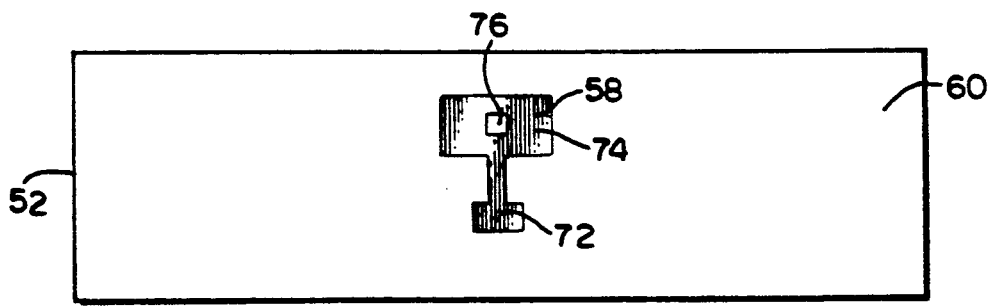
Figure 6:
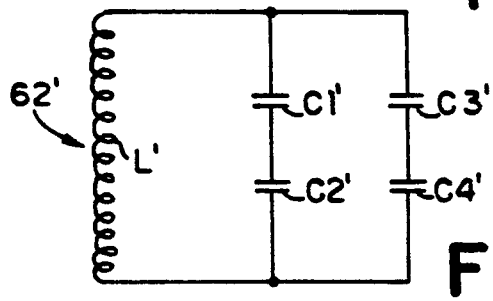
Figure 7:
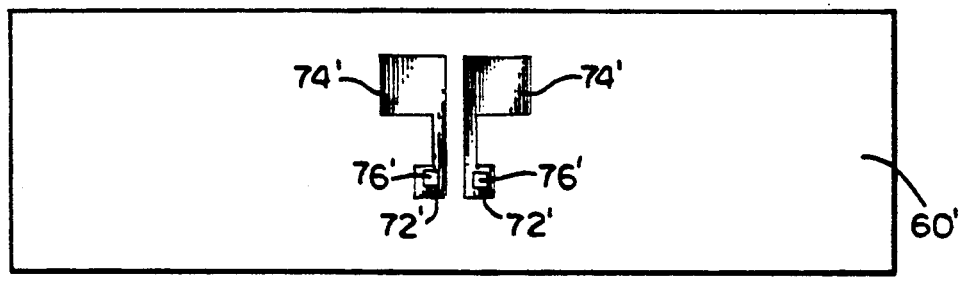

In the drawings:

FIG. 1 is a bottom plan view of a compact disc container which includes a security tag in accordance with a first embodiment of the present invention;

FIG. 2 is a partial top perspective view of the compact disc container of FIG. 1 in a partially open condition;

FIG. 3 is an electrical schematic of the resonant circuit of the security tag shown in FIG. 1;

FIG. 4 is a top plan view of the printed circuit security tag of FIG. 1;

FIG. 5 is a bottom plan view of the security tag of FIG. 4;

FIG. 6 is an electrical schematic of a resonant circuit of a security tag in accordance with a second embodiment of the invention; and FIG. 7 is a bottom plan view of a security tag in accordance with the second embodiment.

DESCRIPTION OF PREFERRED EMBODIMENTS

Referring to the drawings, wherein the same reference numeral designations are applied to corresponding components throughout the figures, there is shown in FIGS. 1 and 2 a compact disc container or case 10 which contains a compact disc 12. The compact disc case 10 is typical of the containers or packaging in which compact discs are generally shipped, stored and/or sold and, therefore, the general structure and use of the case 10 is well known to those skilled in the art. The case 10 is generally rectangularly shaped in plan view (FIG. 1) with a width (left to right when viewing FIG. 1) which generally corresponds to the diameter of a standard compact disc, and a length (top to bottom when viewing FIG. 1) which, for purposes which will hereinafter become apparent, is slightly greater than the diameter of a standard compact disc. The case 10 illustrated in FIG. 1 is approximately 4⅞ inches wide and 5½ inches long. It should be understood that the foregoing dimensions are provided only for the purpose of illustrating the general dimensions of a typical compact disc case and are not intended to be a limitation on the present invention.

The case 10 is comprised of a generally flat tray-like bottom member 14, which includes generally perpendicularly or upwardly extending front and rear walls 16 and 18. A generally flat, tray-like top or lid member 20 includes generally perpendicularly or downwardly extending side-walls 22 and 24 on both lateral sides. The depth of the front and rear walls 16 and 18 generally corresponds to the depth of the sidewalls 22 and 24. The rear portion of each of the sidewalls 22 and 24 includes a generally inwardly extending pin 26 which engages and extends into a similarly sized opening 28 on recessed partial sidewall portions 30 of the bottom member 14. In this manner, the rear portion of the lid member 20 is hinged to the bottom member 14 to permit the bottom and lid members to pivot with respect to each other between an open position (FIG. 2) and a closed position. The bottom member 14 and lid member 20 thus cooperate to form a generally closed container for receiving and holding the compact disc 12. The lid member 20 includes a plurality of small, generally inwardly extending lugs 32 adapted to receive and hold a graphics panel (not shown) for identifying the compact

4 disc and/or the subject matter of the compact disc. A similar graphics panel (not shown) may be located in the bottom member 14 and a smaller graphics panel (not shown) may be positioned along the front wall 16.

In the presently preferred embodiment, the compact disc case 10 is formed of a lightweight material, such as plastic. Preferably, both the bottom and lid members 14 and 20 are generally transparent or translucent in order to permit unobstructed viewing of the graphics panels and/or the compact disc 12 and to otherwise provide a pleasing package for the compact disc 12.

The case 10 further includes an insert member 34 which is located within the bottom member 14. The insert member 34 is formed of a lightweight material, such as plastic, and, in the present embodiment, is generally opaque and colored to provide a pleasing appearance for the case 10. The insert member 34 is sized to fit tightly within the bottom member 14 and has an overall thickness which generally corresponds to the depth of the front and rear walls 16 and 18 of the bottom member 14.

A generally annular groove 36 is formed in the insert member 34. The outer diameter of the groove 36 closely corresponds to the outer diameter of the compact disc 12. The inner diameter of the groove 36 closely corresponds to the inner diameter of the opening 38 at the center of the compact disc 12. A plurality of generally upwardly and radially outwardly extending, generally springy finger members 40 are also provided on the insert member 34 at the center of the groove 36. In this manner, the compact disc 12 may be inserted into the groove 36 so that the finger members 40 extend into the disc opening 38 and generally releasably engage and retain the compact disc 12 in place within the insert member groove 36. The insert member 34 also holds the bottom graphics panel (not shown) in place within the bottom member 14. The insert member 34, in combination with the bottom member 14 and lid member 20, provide protection for the compact disc 10 during shipment, storage and display.

The compact disc storage case 10, as described above, is typical of the type of container presently used for shipment, storage and display of compact discs. It should be fully appreciated by those skilled in the art that the present invention is not limited to use with any particular type, size, style or construction of compact disc container and that the compact disc case 10, as thus far described, is merely for the purpose of illustrating the structure and operation of the present invention.

In the past, problems have occurred in employing prior art security tags in conjunction with compact discs and compact disc containers, particularly containers of the type described above. Typically, such prior art security tags are generally square in plan view. When securing a prior art security tag to a compact disc storage container of the type described above, all or at least a significant portion of the security tag was in an overlapping relationship with the compact disc 12 within the container 10. As is well known in the art, compact discs are generally made, at least in part, of metal, typically a ferrous metal or alloy thereof. When a prior art security tag was employed with such a compact disc container, the metal in the compact disc detrimentally affected the operation and efficiency of the security tag. The metal of the compact disc either changed the resonant frequency of the security tag, blocked or attenuated the transmitted electromagnetic energy from reaching the security tag, or blocked or attenuated the radiation of the resonant frequency energy from the security tag. In some situations, two or more of these factors combined to decrease the effectiveness of the security tag to a point where an electronic article security system was no longer fully effective in detecting the theft or unauthorized removal of compact discs.

The present invention overcomes the problems associated with the use of prior art security tags in connection with a compact disc storage container 10 by providing a security tag 50 having a structure which is specifically designed to take into consideration the interaction between the metal of the compact disc 12 and the circuitry of the security tag 50. In addition, because of the structure and placement of the security tag 50 with respect to the compact disc, it is less likely that electromagnetic energy flowing toward or away from the tag 50 is blocked or otherwise attenuated by the metal within the compact disc 12.

FIGS. 4 and 5 show a first preferred embodiment of a security tag 50 in accordance with the present invention. The tag 50 is generally of a type which is well known in the art of electronic article security systems. However, the configuration of the tag 50 is adapted for use with a compact disc case 10 of the type described above. In the presently preferred embodiment, the tag 50 is comprised of an insulated substrate 52, preferably fabricated of a material well known in the art and having predetermined insulative and dielectric characteristics. The tag 50 is also comprised of circuitry means located on the substrate 52 for establishing a resonant circuit by forming predetermined circuit elements which will hereinafter be described.

The circuit elements are formed by the combination of a first conductive pattern 54 imposed on a first or front surface 56 of the substrate 52 and a second conductive pattern 58 imposed on the opposite or rear surface 60 of the substrate 52. The conductive patterns 54 and 58 are formed on the front end rear surfaces 56 and 60 of the substrate 52 utilizing electrically conductive materials of a known type, such as aluminum, and in a manner which is well known in the electronic article surveillance art. One method of forming such conductive patterns is described in detail in U.S. Pat. No. 3,913,219, entitled "Planar Circuit Fabrication Process," which is incorporated herein by reference. It will, of course, be appreciated by those skilled in the art that the specific conductive patterns 54 and 58, as shown in FIGS. 4 and 5, are only for the purpose of illustrating a first preferred embodiment of the present invention and that other conductive patterns may be developed as alternative embodiments of the invention. Similarly, while it is presently preferred that the materials and methods set forth in the above-referenced U.S. Pat. No. 3,913,219 and other prior art be employed for the purpose of fabricating the security tag 50, it will be appreciated by those skilled in the art that other suitable materials and/or fabrication methods could alternatively be employed.

As discussed above, the security tag 50 is used with an electronic security system (not shown) employed to provide article security for a surveilled security area. The security system includes a transmitter means or transmitter (not shown) of a type well known in the art, for transmitting into the surveilled area electromagnetic energy, preferably radio frequency energy within a predetermined detection frequency range, in the illustrated embodiment, at about 8.2 MHz. The electronic security system further includes a receiver means or receiver (not shown), also of a type well known in the art, for detecting the presence of a security tag resonating within the surveilled area in response to the transmitted electromagnetic energy. Electronic security systems of this type are generally well known in the art and are commercially available from several manufacturers, including Checkpoint Systems, Inc., the assignee of the present invention. Such electronic security systems are described in detail in U.S. Pat. Nos. 4,692,744 and 4,831,363, each of which is incorporated herein by reference. Complete details of the structure and operation of such electronic security systems are not necessary for an understanding of the present invention. Such details may be obtained by referring to the above-identified patents and/or from the manufacturers of such electronic security systems.

FIG. 3 is a schematic illustration of the circuitry means or electrical circuitry employed by the tag 50 for establishing a resonant circuit 62. In the present embodiment, the resonant circuit 62 is comprised of an inductance component or inductor L which is connected in parallel with a capacitance component or capacitor C. In the security tag 50 shown in FIGS. 4 and 5, the inductor L is formed by coil portion 64 of the first conductive pattern 54 on the front tag surface 56 (FIG. 4). The coil portion 64 is generally rectangularly shaped in top plan view. However, a portion 66 of one side of the rectangular coil portion 64 is generally arcuately shaped and extends toward the opposite rectangular side, as shown in FIG. 4. Preferably, the inner or smaller diameter of the arcuate portion 66 generally corresponds to or is slightly greater than the outer diameter of the compact disc 12 for reasons which will hereinafter become apparent. The capacitor C is formed by the generally arcuate land 68 of the first conductive pattern 54 and the generally rectangular land 74 of the second conductive pattern 58.

FIG. 1 shows the security tag 50 installed within the compact disc case 10. Preferably, the width of the substrate 52 generally corresponds to the width of the bottom case member 14, as illustrated. With the security tag 50 installed within the case 10, as illustrated in FIG. 1, a first portion of the substrate, including the coil portion 64 establishing the inductance extends beyond the periphery of the compact disc 12. A second portion of the substrate, which includes arcuate land 68 and rectangular plate 74, establishing the capacitor C overlaps at least a portion of the compact disc 12.

The tag 50 is held in place within the case 10 by the insert member 14. The bottom graphics panel (not shown) is installed between the tag 50 and the bottom member 14 so the tag 50 cannot be seen. The tag 50 may be installed into the case 10 at the time the case is manufactured, at the time the case with the compact disc is placed in a retail display for sale, or at any other time in the manufacturing or sales chain.

As discussed briefly above, compact discs are generally formed, at least in part, of a ferrous metal or alloy thereof. The amount of metal in a compact disc may vary from disc to disc, but generally is with a predetermined, identifiable range. It is generally well known that the capacitance of a capacitor is affected when it is placed in close proximity with a ferrous metal. By positioning the security tag 50 in the manner shown in FIG. 1, the capacitance of capacitor C is altered by interaction between the conductive land 74 of capacitor C and the ferrous metal within the compact disc 12. In general, the interaction of the metal within the compact disc 12 causes the capacitance of capacitor C to increase by a predetermined amount, depending upon the thickness of the metal within the compact disc. The present invention utilizes the known increase in capacitance when establishing the values of inductance L and capacitor C for creating a resonant circuit 62 at a desired detection frequency within the detection frequency range. Essentially, the value of capacitor C is selected to initially be low enough when outside of the case 10 so that when the security tag 50 is placed within the case 10 the increase in capacitance of capacitor C in combination with the inductor L creates a resonant circuit at the selected detection frequency.

It should be further noted that when the security tag 50 is placed within the compact disc case 10 in the manner shown in FIG. 1 the entire coil portion 64 extends beyond the periphery of the compact disc 12. It is generally known that it is the inductor L which serves as the receiving and radiating antenna portion of the resonant circuit 62. Since the coil portion 64 which forms the inductor L is separated from the compact disc 12, the inductor does not significantly interact with the ferrous metal of the compact disc, and, therefore, the effectiveness of the inductor L as an antenna for the resonant circuit 62, it is not significantly diminished by its proximity to the compact disc 12.

In use, exposing the resonant circuit 62 to electromagnetic energy from a transmitter (not shown) at a predetermined detection frequency within a detection frequency range results in the circuit 62 resonating at the detection frequency. A receiver (not shown) is employed for detecting the resonance of the resonant circuit 62 and for generating an appropriate alarm signal. In this manner, the tag 50 effectively functions within an electronic article security system to detect and identify the attempted unauthorized removal of a compact disc container holding a compact disc.

It is desirable to also have the ability to conveniently deactivate the tag 50 (as opposed to removing the tag) in order to prevent a tag from activating an electronic security system once a compact disc has been purchased. In general, it is desirable to deactivate the tag 50 in conjunction with the actual purchasing activity performed at a checkout counter, or other such facility, at which the customer purchases the compact disc.

Accordingly, the security tag 50 includes means for preventing the circuit 62 from resonating or from resonating at a frequency which is within the detecting frequency range. In the present embodiment, the capacitor C is short circuited in order to alter the circuit 62. The capacitor C includes an indentation or dimple 76 on rectangular plate 74. The use of such indentations or dimples is well known in the art, as discussed in U.S. Pat. No. 4,498,076, the disclosure of which is incorporated herein by reference. Essentially, exposing the resonant circuit 62 to electromagnetic energy at the detection frequency and at a predetermined minimum power level results in a rapid buildup of induced voltage between the plates of the capacitor C and, due to the dimple 76, diminishing the dielectric between the capacitor plates, the capacitor C breaks down and becomes short circuited. Thus, when a compact disc case containing a shorted tag 50 is exposed to electromagnetic energy from the transmitter within the surveilled security area (i.e., when leaving the store), the resonant circuit does not resonate and, therefore, does not result in the generation of an alarm signal.

FIG. 6 is a schematic illustration of a second preferred embodiment of the present invention. The embodiment illustrated by FIG. 6 is comprised of an activatable/deactivatable security tag of the type generally described in detail in copending U.S. patent application Ser. No. 544,703, filed June 27, 1990, the disclosure of which is incorporated herein by reference. A security tag having a resonant circuit 62' in accordance with the schematic shown in FIG. 6, may be formed on a substrate utilizing conductive patterns similar to that illustrated in FIGS. 4 and 5. More specifically, in forming a security tag in accordance with the schematic of FIG. 6, the inductor L' is formed in substantially the same manner as the inductor L of the above-described embodiment. Similarly, the capacitors C1', C2', C3' and C4' are formed in substantially the same manner as described above in connection with capacitor C. In one embodiment, the first conductive pattern of such a tag is precisely as illustrated in FIG. 4. The second conductive pattern is illustrated by FIG. 7 in which lands 74' cooperate with land 68 to form capacitors C1' and C3' and lands 72' cooperate with land 70 to form capacitors C2' and C4'. As discussed in detail in the referenced patent application, capacitors C2' and and C4' each include dimples 76' for the activation and later deactivation of the resonant circuit 62'.

From the foregoing description, it can be seen that the present invention comprises a security tag which is particularly adapted for use with a compact disc storage container holding a compact disc. It will be recognized by those skilled in the art that changes may be made to the above-described embodiments of the invention without departing from the broad inventive concepts thereof. It is understood, therefore, that this invention is not limited to the particular embodiments disclosed, but is intended to cover any modifications which are within the scope and spirit of the invention as defined by the appended claims.

I claim:

1. A security tag for a compact disc container holding a compact disc, the security tag for use with an electronic security system for a surveilled area, including transmitter means for transmitting into the surveilled area electromagnetic energy within a predetermined detection frequency range and receiver means for detecting within the surveilled area the presence of a security tag resonating at a frequency within the detection frequency range in response to the electromagnetic energy, the security tag comprising:

a generally flat, planar substrate positioned within the compact disc storage container such that a first portion of the substrate extends beyond the periphery of the compact disc and a second portion of the substrate overlaps at least part of the compact disc, the first and second substrate portions lying in a common plane; and circuitry means on the substrate for establishing a resonant circuit, at least part of the circuitry means being located on each of the first and second portions of the substrate, whereby the resonant frequency of the resonant circuit is established at least in part by interaction between the circuitry means and the compact disc.

2. The security tag as recited in claim 1 wherein the circuitry means comprises an inductance and a capacitance connected in parallel with the inductance, at least a portion of the inductance being located on the first portion of the substrate to inhibit interaction between the inductance and the compact disc and at least a portion of the capacitance being located on the second portion of the substrate to promote interaction between the capacitance and the compact disc.

3. The security tag as recited in claim 2 wherein at least a portion the capacitance is located on the first portion of the substrate whereby the capacitance of the capacitor is increased by the interaction with the compact disc so that the resonant circuit has a resonant frequency within the detection frequency range.

4. The security tag as recited in claim 3 further including means for short-circuiting the capacitor when the resonant circuit is exposed to electromagnetic energy within the detection frequency range of at least a predetermined minimum power level to thereby deactivate the tag.

5. The security tag as recited in claim 2 wherein the capacitance is comprised of:
   a first capacitance branch connected in parallel with the inductance, the first capacitance branch including a first capacitor connected in series with a second capacitor; and
   a second capacitance branch connected in parallel with the inductance and with the first capacitance branch, the second capacitance branch including a third capacitor connected in series with a fourth capacitor, the first and third capacitors being located on the first portion of the substrate and the second and fourth capacitors being located on the second portion of the substrate, whereby the a capacitance of the second and fourth capacitors is increased by the interaction of the second and fourth capacitors with the compact disc so that the resonant circuit has a first resonating frequency within a first frequency range beyond the detection frequency range.

6. The security tag as recited in claim 5 wherein the second and fourth capacitors each include means for short-circuiting one of the second and fourth capacitors when the resonant circuit is exposed to electromagnetic energy within the first frequency range of at least a predetermined minimum power level for changing the resonant frequency of the resonant circuit to a second frequency within the detection frequency range to thereby activate the tag and for thereafter short-circuiting the other of the second and fourth capacitors when the resonant circuit is exposed to electromagnetic energy within the detection frequency range of at least a predetermined minimum power level for changing the resonant frequency of the resonant circuit to a third frequency beyond the detection frequency range to thereby deactivate the tag.

* * * * *